United States Patent [19]

Nishikawa et al.

[11] Patent Number: 5,691,782
[45] Date of Patent: Nov. 25, 1997

[54] LIQUID-CRYSTAL DISPLAY WITH INTER-LINE SHORT-CIRCUIT PREVENTIVE FUNCTION AND PROCESS FOR PRODUCING SAME

[75] Inventors: Ryuji Nishikawa, Hashima-gun; Yoshikazu Hirose, Anpachi-gun, both of Japan

[73] Assignee: Sanyo Electric Co., Ltd., Osaka, Japan

[21] Appl. No.: 499,633

[22] Filed: Jul. 7, 1995

[30] Foreign Application Priority Data

Jul. 8, 1994 [JP] Japan ................. 6-157310
Dec. 9, 1994 [JP] Japan ................. 6-306549

[51] Int. Cl.⁶ ......................... G02F 1/136; G02F 1/1333
[52] U.S. Cl. ................................. 349/47; 349/110
[58] Field of Search ........................ 359/59, 67, 74, 359/79; 349/46, 110–138, 47

[56] References Cited

U.S. PATENT DOCUMENTS

| 4,563,806 | 1/1986 | Coissard et al. | 359/59 |
| 4,687,298 | 8/1987 | Aoki et al. | 359/59 |
| 4,810,060 | 3/1989 | Ukai | 359/59 |
| 4,948,231 | 8/1990 | Aoki | 359/59 |
| 5,162,933 | 11/1992 | Kakuda et al. | 359/59 |
| 5,243,260 | 9/1993 | Vinouze et al. | 359/59 |
| 5,432,527 | 7/1995 | Yanai | 359/59 |
| 5,459,596 | 10/1995 | Ueda et al. | 359/59 |
| 5,514,909 | 5/1996 | Yamamoto et al. | 257/65 |

FOREIGN PATENT DOCUMENTS

| 186-036 | 7/1986 | European Pat. Off. | 359/59 |
| 59-232385 | 12/1984 | Japan . | |
| 61-078166 | 4/1986 | Japan . | |

Primary Examiner—William L. Sikes
Assistant Examiner—Tiep H. Nguyen
Attorney, Agent, or Firm—Loeb & Loeb LLP

[57] ABSTRACT

In a liquid-crystal display, a gate line and a gate electrode for a thin film transistor, and constituting a part of the gate line, are formed to be narrower than the line width of an insulating layer disposed below them. A distance from the gate line and the gate electrode to a source electrode and a drain electrode for the thin film transistor, as well as a pixel electrode and a drain line disposed below the insulating layer, is increased by a difference between the line widths of the gate line and the gate electrode and the line width of the insulating layer. Thus, the possibility of a short-circuit occurring between the gate line and the gate electrode due to hillocks is lowered. Further, the line widths of the gate line and the gate electrode are adjusted by adjusting the etching quantity of the side faces of the gate line and the gate electrode.

12 Claims, 10 Drawing Sheets

LIQUID-CRYSTAL DISPLAY WITH INTER-LINE SHORT-CIRCUIT PREVENTIVE FUNCTION AND PROCESS FOR PRODUCING SAME

BACKGROUND OF THE INVENTION

1. Field of the Invention

This invention relates to a liquid-crystal display which is realized by a process capable of reducing the number of masks to be used, and particularly to a liquid-crystal display whose yield is improved by preventing a short-circuit from occurring between a gate and a source and between a gate and a drain due to lateral hillocks on a gate of aluminum (Al).

2. Description of the Prior Art

Liquid-crystal displays have advantages, such as that they are small and thin and have low power consumption, and they have become commercially practical in the fields of 0A equipment, AV equipment and the like. Particularly, active matrix type liquid-crystal displays using thin film field effect transistors (hereinafter referred to as TFT (thin film transistor)) can theoretically perform a static multiplexed drive at a duty ratio of 100% using line at a time scanning drive, enabling the display of motion video at high definition and with a high-contrast ratio.

The active matrix type liquid-crystal display has a structure such that TFTs are connected to a plurality of liquid crystal driving pixel electrodes formed on a substrate, pixel capacitors are formed between each pixel electrode and a portion of a common electrode, formed on another substrate, opposite to the pixel electrode, with a liquid crystal layer between the two substrates, and different voltages are applied to each pixel capacitor to maintain the pixel charge. Orientation of the liquid crystal is changed responding to an electric field formed in each pixel capacitor to modulate transmitted light beams, and a display image is formed by macroscopically composing brightness of each pixel.

The TFT is a switching element for applying voltage to a pixel electrode and consists of a gate electrode, a drain electrode, a source electrode and a non-monocrystal semiconductor layer. Each electrode is connected to a gate line, a drain line and the pixel electrode, and the non-monocrystal semiconductor layer is made of amorphous silicon (a-Si) or polysilicon (p-Si) and works as a channel layer. A group of gate lines is line at a time scanned to be selected to turn on all TFTs on one scanning line (one gate line), and data signals synchronized with them are sent to respective pixel electrodes through each drain line. The common electrode has its voltage determined in synchronization with scanning signals to drive a liquid crystal in the space using a voltage between the common electrode and each pixel electrode opposite thereto. Light transmittance per display pixel is then adjusted, and composed gradation display of each display pixel is visually recognized as a display image. The liquid crystal driving state with TFTs in an OFF condition is continued for a period of one field by a voltage maintained by the display pixel capacitor consisting of both the electrodes, and the addition of a storage capacitor in parallel thereto can increase a holding ratio.

Figure 1:
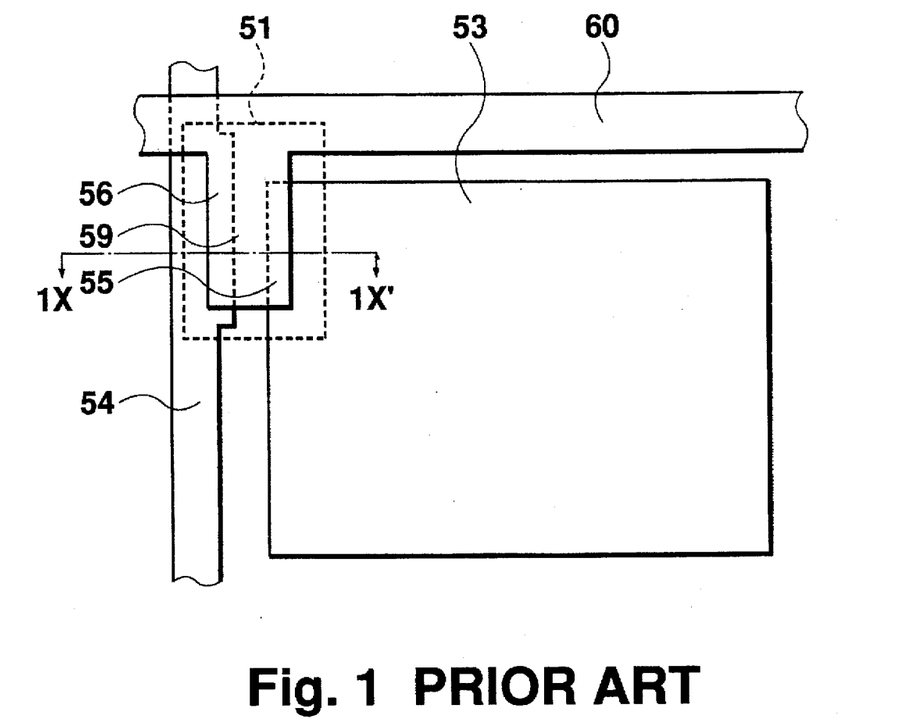
FIG. 1 is a plan view of a conventional liquid-crystal display.
Figure 2:
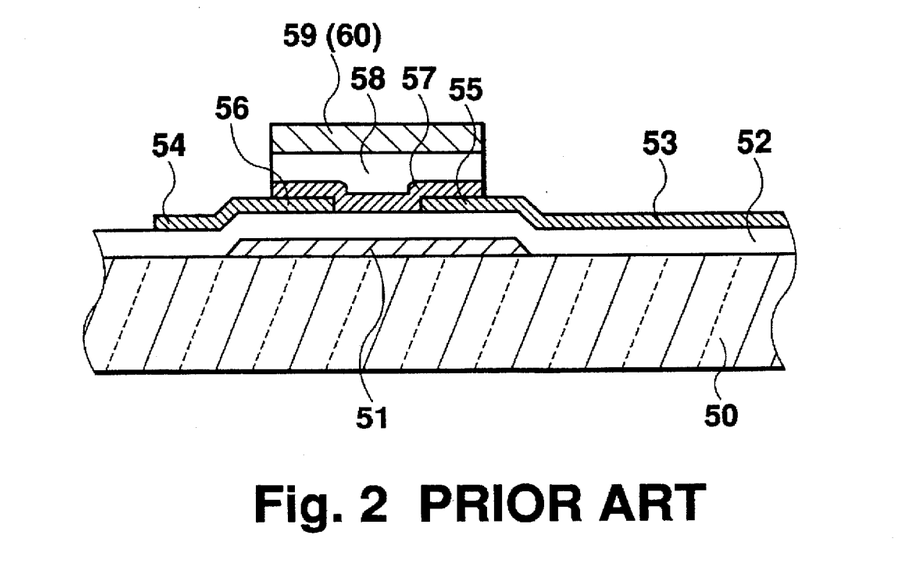
FIG. 2 is a partial cross-sectional view of the display of FIG. 1 taken along line 1X-1X'.

A conventional liquid-crystal display using a staggered type TFT having a gate at the upper position will be described. FIGS. 1 and 2 show the structure of a conventional TFT substrate. FIG. 1 is a plan view and FIG. 2 a cross-sectional view taken along 1X–1X' of FIG. 1. In these figures and other figures in following explanations, the layers and so on are not illustrated to the same scale. A shading layer (51) which prevents light from entering the TFT channel is made of Cr or the like, and an interlayer insulator (52) of $SiO_2$ or the like is formed on a substrate (50) to cover the shading layer (51). A pixel electrode (53) having a source electrode (55) and a drain line (54) having a drain electrode (56) are made of a transparent conducting material ITO (indium tin oxide) on the interlayer insulator (52). A gate line (60) of Al formed on a double layer structure consisting of a-Si and an insulating layer is disposed to intersect the drain line (54). A gate electrode (59) continued from the gate line (60) is disposed near the intersection of the gate line (60) and the drain line (54). In this area, the source electrode (55), the drain electrode (56), an a-Si layer (57) disposed on them, a gate insulating layer (58) made of SiNx or the like, and the gate electrode (59) are stacked to form a TFT. Though not shown, an a-Si layer having lots of impurities (e.g., phosphorus) doped to reduce resistance is generally placed between the a-Si layer (57) and the source electrode (55) and between the a-Si layer (57) and the drain electrode (56) to improve ohmic characteristics.

After completing the above pattern, an orientation film of polyimide or the like is formed on the entire surface of the TFT substrate to control the orientation of a liquid crystal before carrying out a prescribed rubbing treatment. This TFT substrate is then bonded to a counter substrate having a common electrode formed on the surface with a liquid crystal charged therebetween, and the edges of the substrates are sealed to complete a liquid-crystal display.

The above TFT substrate production process includes three photolithographic steps; a first step for etching the Cr which forms the shading layer (51), a second step for etching the ITO which forms the pixel electrode (53), the drain line (54), the source and drain electrodes (55, 56), and a third step for etching the Al which forms the gate line (60) and the gate electrode (59). The a-Si layer (57) and the gate insulating layer (58) are etched in the third photo-lithographic step using the same mask as used for etching the gate line (60) and the gate electrode (59).

Thus, the staggered type TFT can be formed on the TFT substrate by the three photolithographic steps, so that its production cost is low. However, since the gate insulating layer (58) is etched to have the same pattern as the gate line (60) and the gate electrode (59), there are the following problems.

Since the lower layers such as the drain line (54), the source electrode (55) and the drain electrode (56) are exposed, they are separated from the upper layers such as the gate line (60) and the gate electrode (59) by a distance amounting to the thickness of the gate insulating layer (58) in a direction of the substrate thickness. Also, the upper layers are insulated from the lower layers by the thickness of the gate insulating layer (58). On the other hand, it is known that Al having a low resistance is suitable as a gate line material, but Al is poor in thermal resistance, forming so-called hillocks (or bumps) which protrude in the form of a rod. The hillocks grow further in the heat treating process and may become 1 micrometer in height.

The gate insulating layer (58) has a thickness of about 0.3–0.5 micrometer, and when the hillocks (lateral hillocks) are formed in a lateral direction from the side wall of the Al pattern of the gate electrode (59), the distance for the thickness of the gate insulating layer (58) is not sufficient to prevent the lateral hillocks, which may reach the lower layers such as the source and drain electrodes (55, 56).

A filler is specifically sprayed between the TFT array substrate and the counter substrate in order to keep a fixed space between these substrates. When this filler happens to be located in the position of the lateral hillocks, the lateral hillocks are physically pushed down on the lower layers such as the source and drain electrodes (55, 56), resulting in a short-circuit between the gate and the source and between the gate and the drain. This short-circuit between the gate and the source causes a dot defect, and the short-circuit between the gate and the drain causes a line defect, deteriorating display quality.

Figure 3:
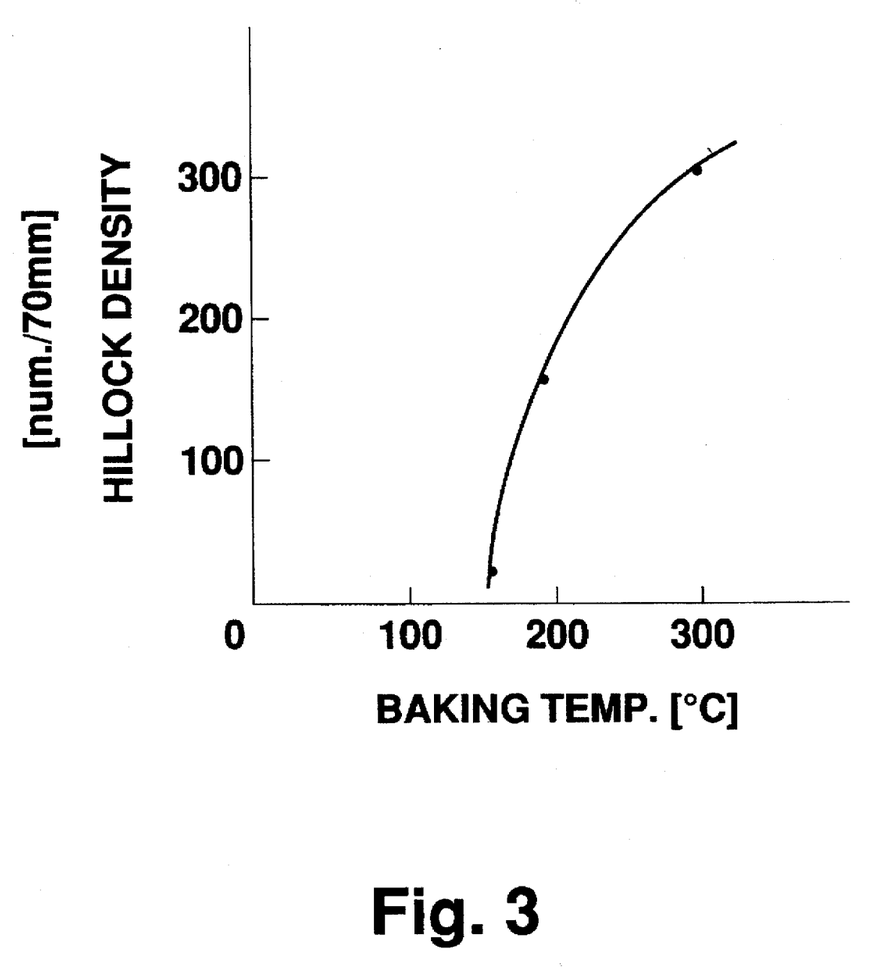
FIG. 3 is a graph showing the hillock density of a conventional liquid-crystal display.

FIG. 3 shows a relationship between a hillock density and a baking temperature. It shows that the hillocks are formed on Al when baked at 150° C. or above. However, an existing production process includes a step for forming a film of polyimide which is an orientation film for controlling the orientation of a liquid crystal after forming the gate electrode (59), and a step at about 200° C. for making a passivation film. Therefore, the generation of hillocks cannot be avoided.

On the other hand, to prevent the occurrence of hillocks, Al is made very thin. Namely, the Al film forming the gate electrode (59) and the gate line (60) can be made to have a thickness of 500 angstroms or below to prevent any hillocks. In this case, a stacked structure with Mo having a thickness of 3000 angstroms can avoid an open line, but the Mo has specific resistance about 5 times greater than that of Al, and is not suitable to produce a large panel in view of line resistance.

SUMMARY OF THE INVENTION

This invention aims to provide a liquid-crystal display which is configured to prevent a short-circuit from occurring between a gate and a source and between a gate and a drain due to the occurrence of hillocks on gate metal.

To accomplish the above object, the liquid-crystal display according to this invention includes a plurality of pixel electrodes for a driving a liquid crystal set in a matrix array on a substrate, a plurality of drain lines formed between the columns of the pixel electrodes, a plurality of gate lines formed between the rows of the pixel electrodes and having lower layers such as an insulating layer and a semiconductor layer, a plurality of thin film transistors, each being formed near the crossing points of the drain lines and the gate lines, each applying a voltage to a pixel electrode. Each thin film transistor has a source electrode constituting a portion of the pixel electrode, a drain electrode constituting a portion of the drain line, the semiconductor layer being formed to extend over the source electrode and the drain electrode, the insulating layer being formed on the semiconductor layer, and a gate electrode being formed on the insulating layer and constituting a portion of the gate line. Also, the gate lines and the gate electrodes are characterized by being formed to be narrower than the line width of the insulating layer.

Thus, when the widths of the gate line and the gate electrode are formed narrower than the line width of the insulating layer, a distance from the gate line and the gate electrode to the source electrode (pixel electrode) and drain electrode (drain line) disposed at the lower position below them becomes equal to the thickness of the insulating layer plus a difference between the line width of the gate line (and electrode) and the line width of the insulating layer. Therefore, when aluminum is used for the gate line and the gate electrode, even if hillocks are formed on the aluminum, the protruding ends of the hillocks do not reach the source and drain electrodes (lines) to cause a short-circuit.

Use of Al containing Nd as material for the gate electrode and the gate line improves heat resistance. Thus, formation of hillocks is suppressed even if a high-temperature step is included in a process following the formation of the gate electrode and the gate line. Therefore, even when the gate electrode and the gate line are formed to have the same line width as that of the lower insulating layer, a short-circuit due to the formation of hillocks is prevented from occurring between these gates and the lower layers such as the source electrode and the drain electrode (drain line). When the gate electrode and the gate line are formed to have a line width narrower than that of the insulating layer, a short-circuit due to hillocks can be more securely prevented from occurring.

The invention is also characterized in that a substantially tapered shading layer is formed at a position corresponding to a channel section of the thin film transistor on the substrate.

Besides, the gate line intersects the drain line via the semiconductor layer and the insulating layer. Thus, at the crossing point of the drain line and the gate line, a distance between the gate line and the drain line is a difference between the line widths of the gate line and the insulating layer plus the thickness of the insulating layer, such that the possibility of a short-circuit occurring between the two lines can be reduced even if hillocks are formed on the gate line.

A process for producing the above liquid-crystal display has a step for forming a transparent conducting layer on the substrate, a step for etching the transparent conducting layer with a first mask to form the pixel electrode, the drain line, the source electrode and the drain electrode, a step for sequentially forming the semiconductor layer, the insulating layer and the conducting layer after forming the drain line and the three electrodes, a step for forming a second mask on the conducting layer and etching the conducting layer with the second mask into the same shape as the second mask, a step for further etching the side face of the etched conducting layer to provide the conducting layer with a pattern having a line width narrower than the second mask to form the gate line and the gate electrode, and a step for etching the insulating layer and the semiconductor layer with the second mask so as to form them the same shape as the second mask.

The invention is characterized in that the conducting layer is etched by an isotropic etching (e.g., a wet type etching, a plasma etching), and the insulating layer and the semiconductor layer are etched by an anisotropic etching (e.g., a dry type etching).

Thus, the gate line and the gate electrode are etched to have a pattern with a line width narrower than the second mask, so that using a simple procedure, a short-circuit can be prevented from occurring between the electrodes (lines) due to the occurrence of hillocks. Furthermore, the same mask can be used to etch the gate line and the gate electrode as well as the insulating layer and the semiconductor layer, so that the photolithographic steps can be decreased to a single step, enabling a reduction of the production cost.

The conducting layer constituting the gate line and the gate electrode can be formed using Al containing Nd, such that the formation of hillocks is decreased as described above.

Besides, prior to the formation of the thin film transistor, it is designed to form a substantially tapered shading layer formed by creating a light insulating layer of Cr at a position corresponding to a channel section of the thin film transistor on the substrate, making the upper layer of the light insulating layer with chromium nitride in a nitrogen atmosphere when producing the upper layer of the light insulating layer, and etching the light insulating layer. Thus, the edges of the shading layer are provided with a large curvature, eliminating stepped portions. Therefore, the thin film transistor and various types of line to be formed on the shading layer via the insulating layer or the like can be prevented from being broken on the steps at the edges of the shading layer.

DESCRIPTION OF THE PREFERRED EMBODIMENTS

Embodiments of the present invention will now be described with reference to the attached drawings.
Embodiment 1

Figure 4:
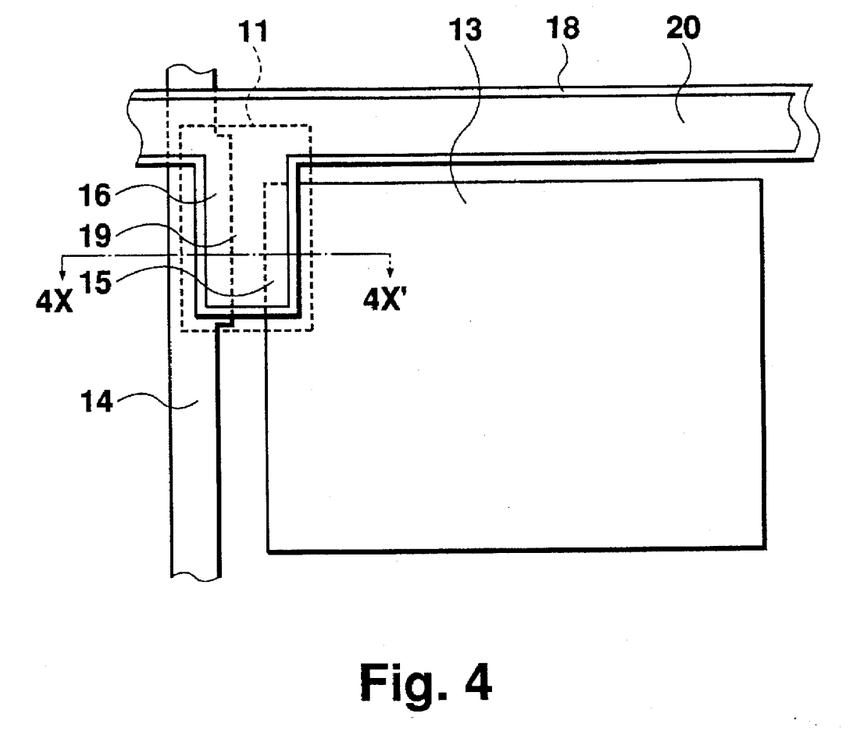
FIG. 4 is a plan view of the liquid-crystal display according to Embodiment 1 of the invention.
Figure 5:
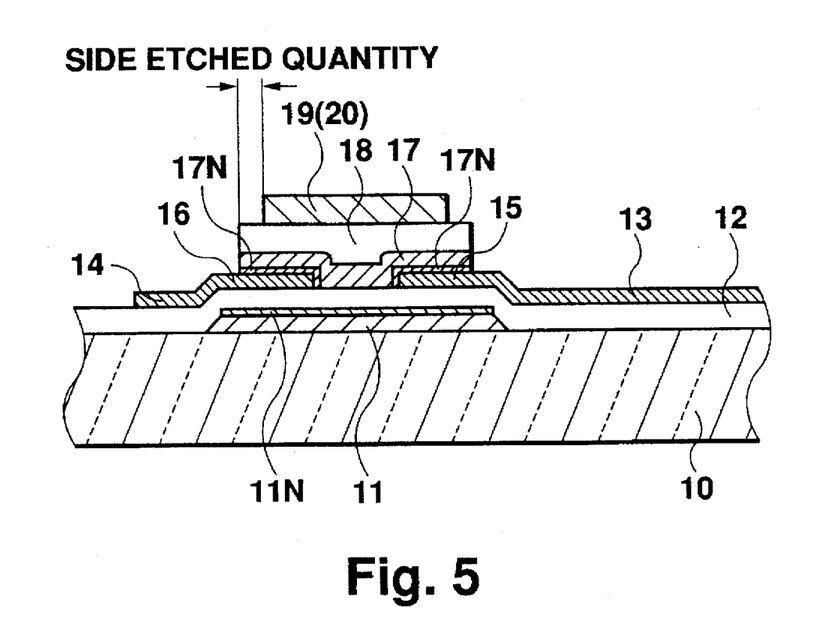
FIG. 5 is a partial cross-sectional view of the liquid-crystal display of FIG. 4 taken along line 4X-4X'.

FIG. 4 is a plan view of the liquid-crystal display according to Embodiment 1 of the invention, and FIG. 5 is a cross-sectional view along line 4X-4X' of FIG. 4. An interlayer insulating layer (12), which covers a shading layer (11N) made of Cr or the like and a shading layer (11), is formed on a transparent substrate (10), and a pixel electrode (13) made of ITO, a drain line (14), a source electrode (15) integral with the pixel electrode (13), and a drain electrode (16) integral with the drain line (14) are formed on the interlayer insulating layer (12). An a-Si layer (17), a gate insulating layer (18), and a gate electrode (19) are stacked in this order on the source and drain electrodes (15, 16) to form a TFT. A gate line (20), which is formed on the gate insulating layer (18), is made of Al and formed to have the same pattern as the a-Si (17) and the gate insulating layer (18), intersecting the drain line (14).

In this embodiment, the gate electrode (19) and the gate line (20) are formed to be narrower than the gate insulating layer (18). Even if lateral hillocks are produced on Al which constitutes the gate electrode (19) and the gate line (20), they are prevented from reaching the drain line (14) and the source and drain electrodes (15, 16) which are positioned at the lower position through the gate insulating layer (18). Namely, the gate electrode (19) and the gate line (20) at the upper position with the gate insulating layer (18) below them are separated from the drain line (14), the source electrodes (15) and the drain electrodes (16) at the lower position by a total of the thickness of the gate insulating layer (18) and a distance between the pattern edges of the gate insulating layer (18) and the pattern edges of the gate electrode (19) or the gate line (20). Thus, the lateral hillocks on the gate electrode (19) and the gate line (20) made of Al do not reach the drain line (14), the source electrodes (15) and the drain electrodes (16).

Figure 6:
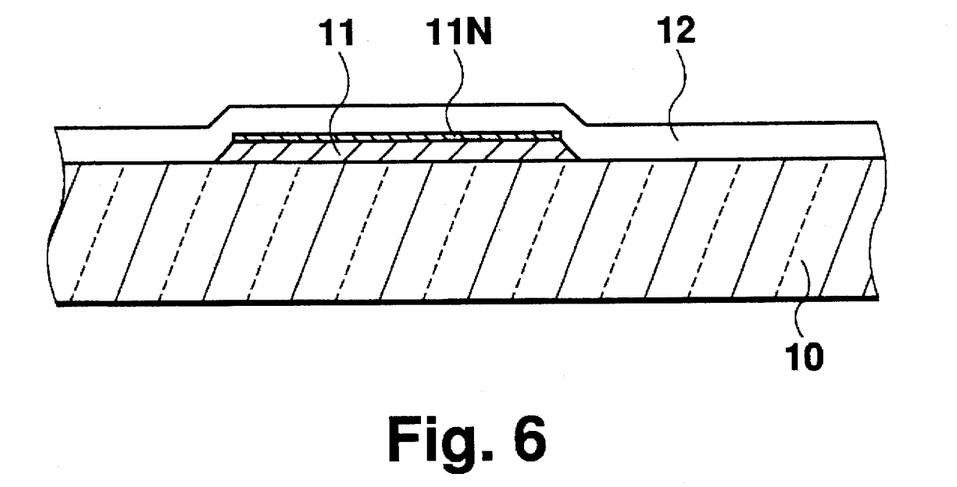
FIGS. 6 to 11 are cross-sectional views showing a process for producing the liquid-crystal display according to Embodiment 1 of the invention.

A process for producing the above-mentioned liquid-crystal display will now be described. In FIG. 6, Cr was sputtered on the substrate (10) made of glass or the like, and etched to form the shading layer (11). The shading layer (11) was formed to have a total thickness of about 1000-2000 angstroms. The upper layer of the shading layer was made of CrNx (11N) having a thickness of 100-300 angstroms by sputtering in a nitrogen atmosphere at the final step of the sputtering process. Since CrNx can be etched faster than Cr, the shading layer (11) had its edges formed to have a tapered cross section by using the CrNx (11N) for the upper layer as described above, eliminating stepped portions. After forming the shading layer (11), the substrate was fully coated with a CVD film of, e.g., silicon nitride, to form the interlayer insulating layer (12).

Figure 7:
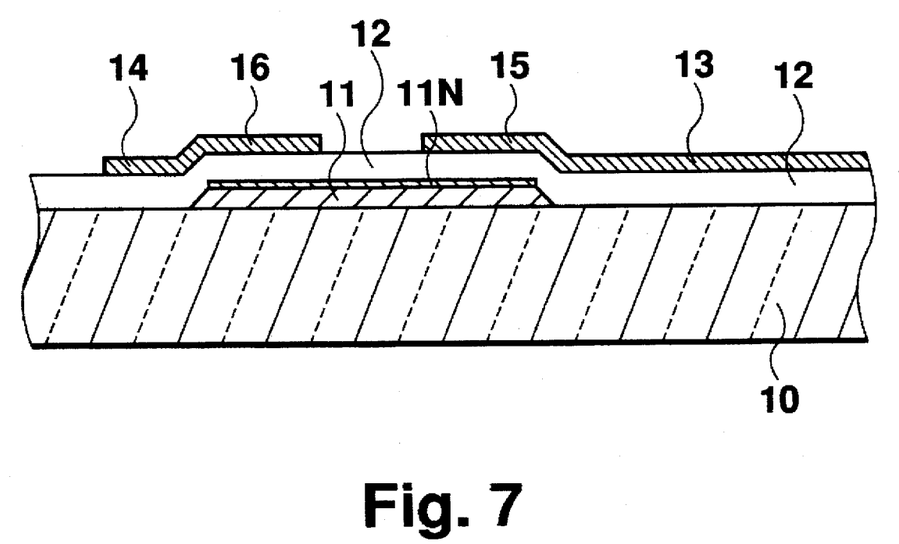

ITO was sputtered on the interlayer insulating layer (12) to a thickness of about 1000 angstroms, and etched into a prescribed pattern to form the pixel electrode (13), the drain line (14), the source electrode (15), and the drain electrode (16) as shown in FIG. 7. As will be described afterwards, to improve the ohmic characteristics of the TFT, N-type impurities such as phosphorus are implanted in advance into the target ITO to add phosphorus to the pixel electrode (13), the drain line (14), the source electrode (15), and the drain electrode (16) using the ITO sputtering process.

Figure 8:
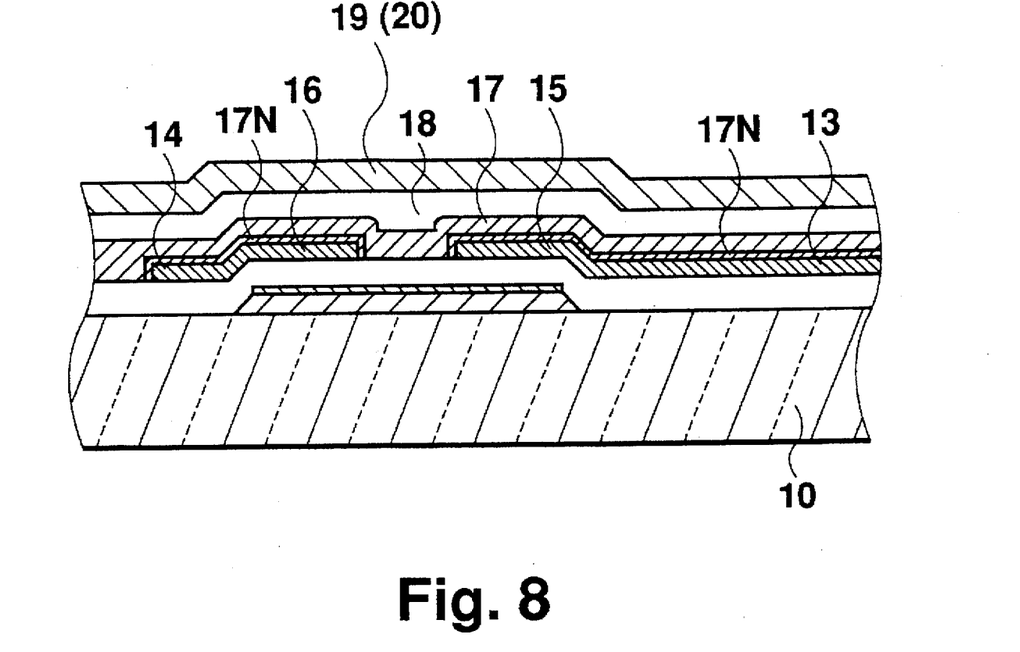

As shown in FIG. 8, the a-Si layer (17) was formed to a thickness of 500-1000 angstroms by plasma CVD on the substrate on which the pixel electrode (13), the drain line (14), the source electrode (15), and the drain electrode (16) had been formed. At this time, the phosphorus contained in the ITO was dispersed toward the a-Si with the growth of the a-Si layer to form an N+ type contact layer (17N) at the interface between the ITO and the a-Si, providing an ohmic contact portion. After forming the a-Si layer (17), silicon nitride is overlayed to form the gate insulating layer (18) having a thickness of 2000-4000 angstroms using plasma CVD. Then, Al is sputtered to a thickness of about 4000 angstroms to form the gate electrode (19) and the gate line (20).

Figure 9:
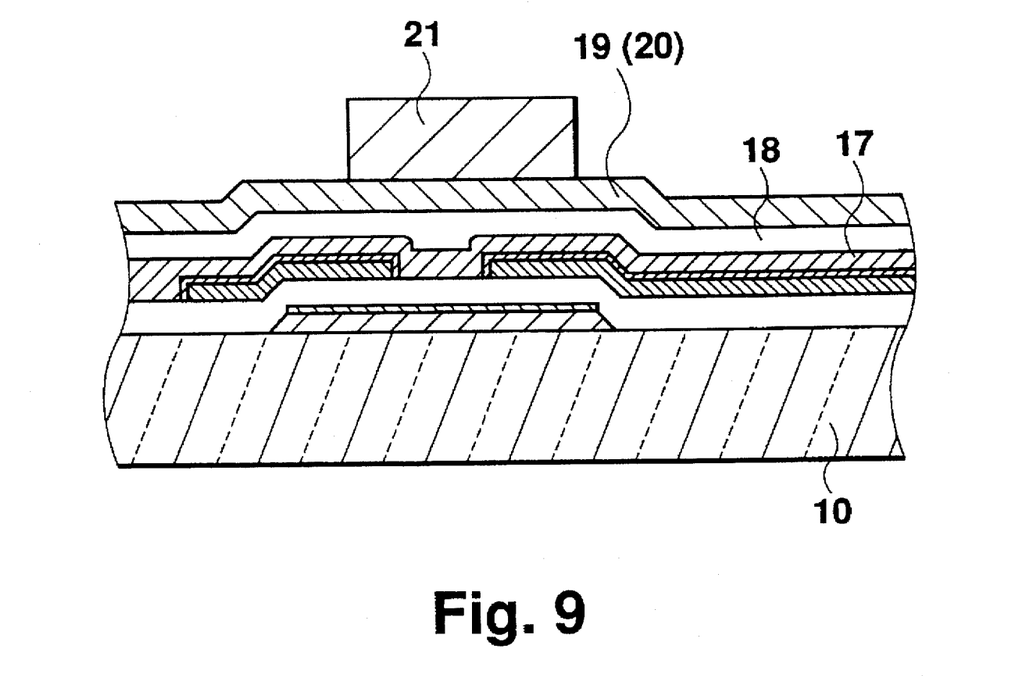
Figure 10:
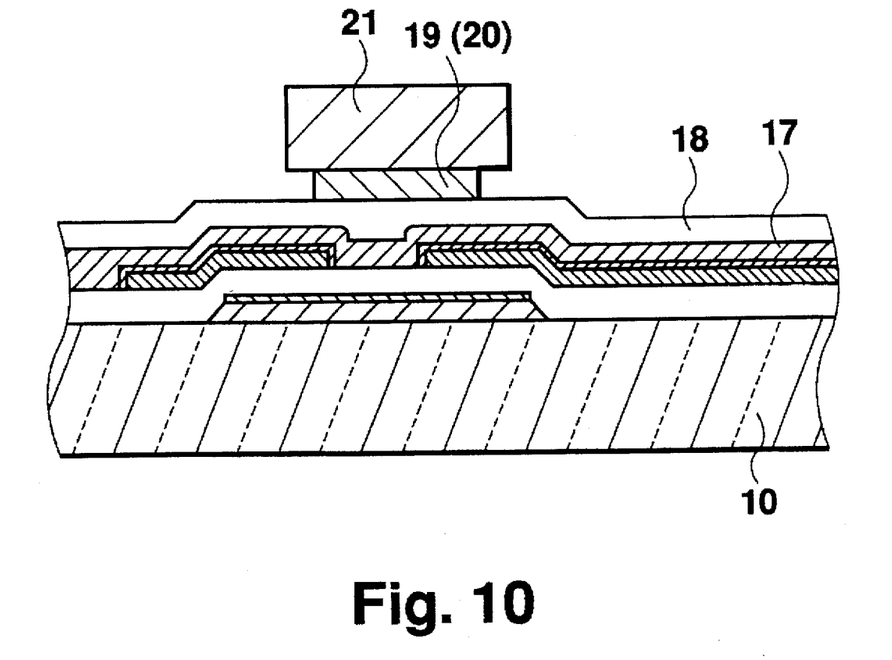

A photoresist (21) having a gate line pattern was formed on the Al layer for the gate electrode (19) and the gate line (20) as shown in FIG. 9. Using the photoresist (21) as a mask, the Al layer was etched with a mixture of acetic acid, phosphoric acid and nitric acid as an etchant to form the gate electrode (19) and the gate line (20) as shown in FIG. 10. Alternatively, the gate electrode and the gate line are formed in narrow patterns by side etching using a plasma etching process. At this time, the etching time was adjusted such that the Al layer was side-etched by about 1 micrometer more than the size of the mask, so that the gate electrode (19) and the gate line (20) had their patterns formed narrower than the photoresist (21).

Figure 11:
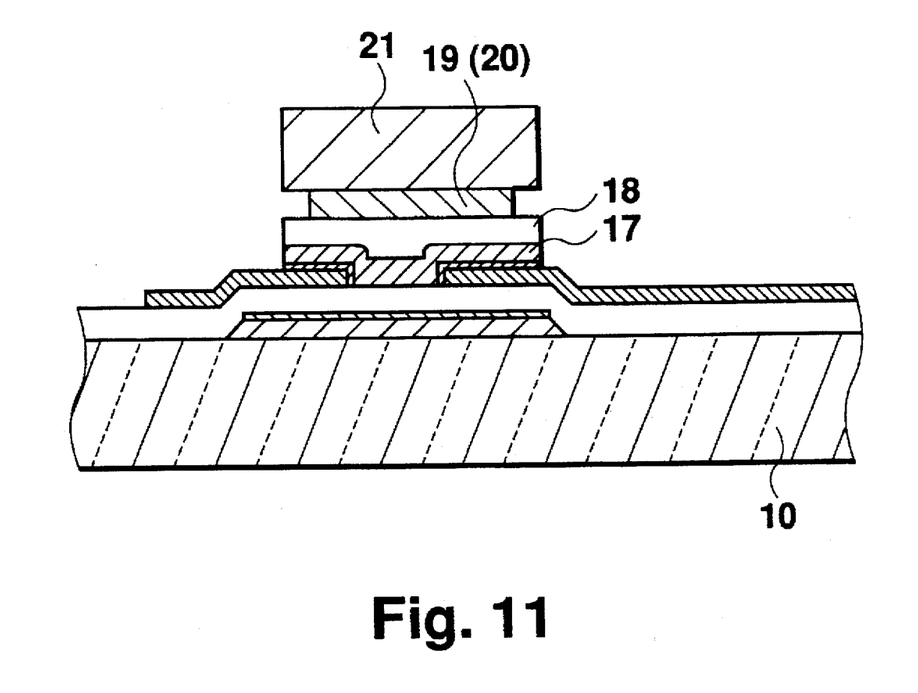

As shown in FIG. 11, anisotropic etching such as an RIE (reactive ion etching) was made with carbon tetrafluoride as an etching gas using the same photoresist (21) as a mask to remove the gate insulating layer (18) and the a-Si layer (17). Thus, the gate insulating layer (18) and the a-Si layer (17) were left in a region along the gate electrode (19) and the gate line (20). The a-Si layer (17), the gate insulating layer (18) and the gate electrode (19) were overlayed in this order on the source electrode (15) and the drain electrode (16) to constitute the TFT.

The photoresist (21) was lastly removed to complete the configuration of FIG. 4.

Thus, in this embodiment, the gate electrode (19) and the gate line (20) are side-etched by isotropic etching, e.g., wet etching or plasma etching to have a pattern narrower than the photoresist (21), and the gate insulating layer (18) and the a-Si layer (17) are etched by the anisotropic etching to have the same pattern as the photoresist (21), so that the gate electrode (19) and the gate line (20) have their patterns formed narrower than that of the gate insulating layer (18). Also, the gate electrode (19) and the gate line (20) at the upper position and the drain line (14), the source electrode (15) and the drain electrode (16) at the lower position are separated at their crossing point by a total distance of the thickness of the a-Si layer (17), the gate insulating layer (18) and the side-etched quantity of the Al. Therefore, even when the lateral hillocks are formed on the gate line of Al and the lateral hillocks are pushed downward by a filler, the lateral hillocks do not reach the drain line (14), the source electrode (15) and the drain electrode (16), preventing a short-circuit from occurring between the gate and the source and between the gate and the drain.

Figure 12:
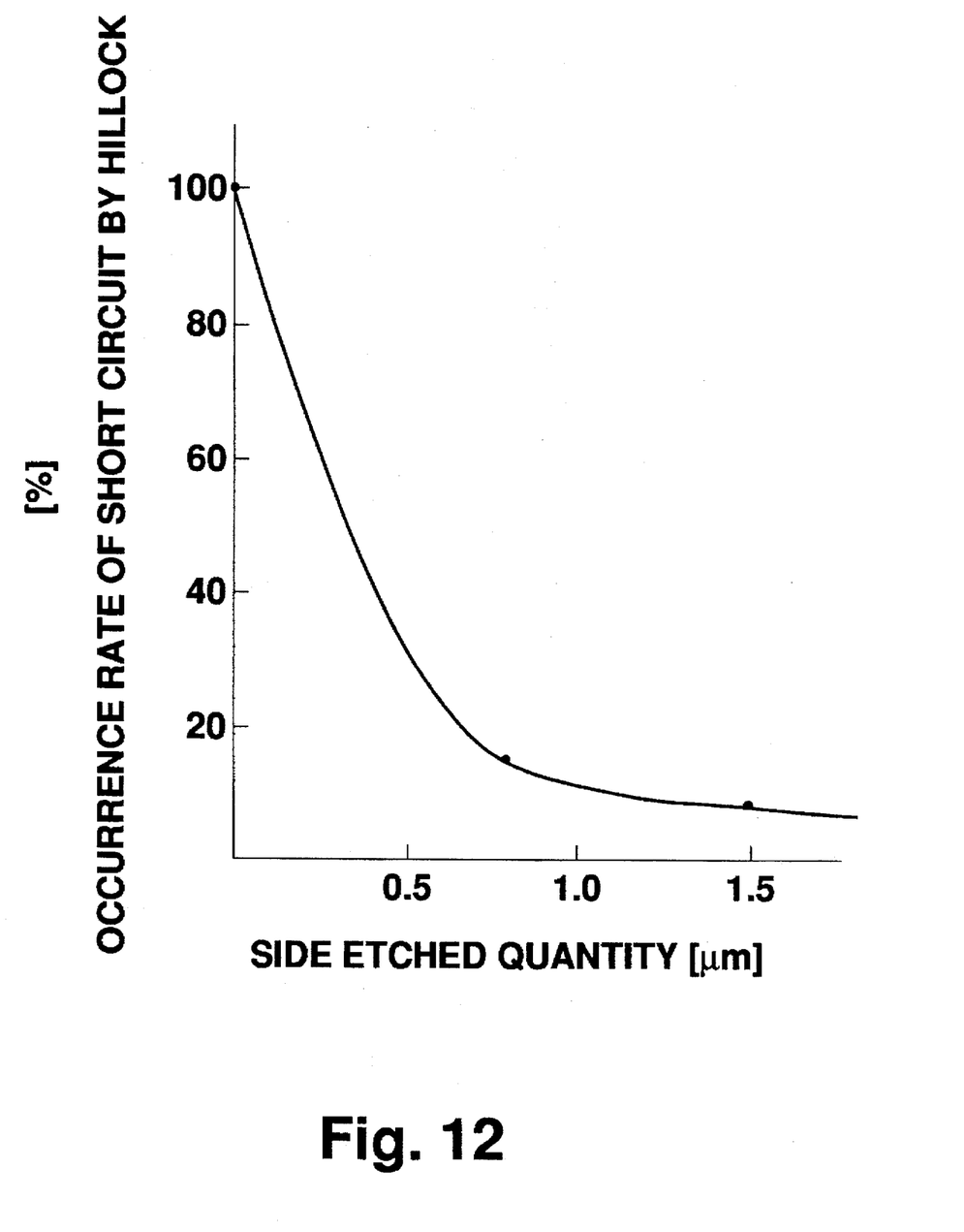
FIG. 12 is a graph showing the relationship between a side etched quantity of a gate and an occurrence rate of short-circuits according to Embodiment 1 of the invention.

FIG. 12 is a test result of the liquid-crystal display according to this embodiment, showing the relationship between an occurrence rate of short-circuits due to hillocks and a side etched quantity. It is seen from FIG. 12 that when the side etched quantity of the gate electrode and the gate line is smaller than about 0.8 micrometers, the occurrence rate of short-circuits largely depends on the side etched quantity, but when the side etched quantity is greater than the above value, the occurrence rate of short-circuits is reliably low. Therefore, the side etched quantity, namely an excess etching quantity of the gate electrode and the gate line based on the side of the gate insulating film or the like, is preferably set to be about one micrometer.

As is obvious from the above description, short-circuits between the gate and the source and between the gate and the drain due to hillocks on the gate line Al, were each prevented in the liquid-crystal display using the staggered type TFTs, and the yield of this display was thus improved.

Also, this type of liquid-crystal display can be attained by adjusting the etching quantity, and produced without increasing the number of masks, enabling an inexpensive production cost.

Embodiment 2

Figure 13:
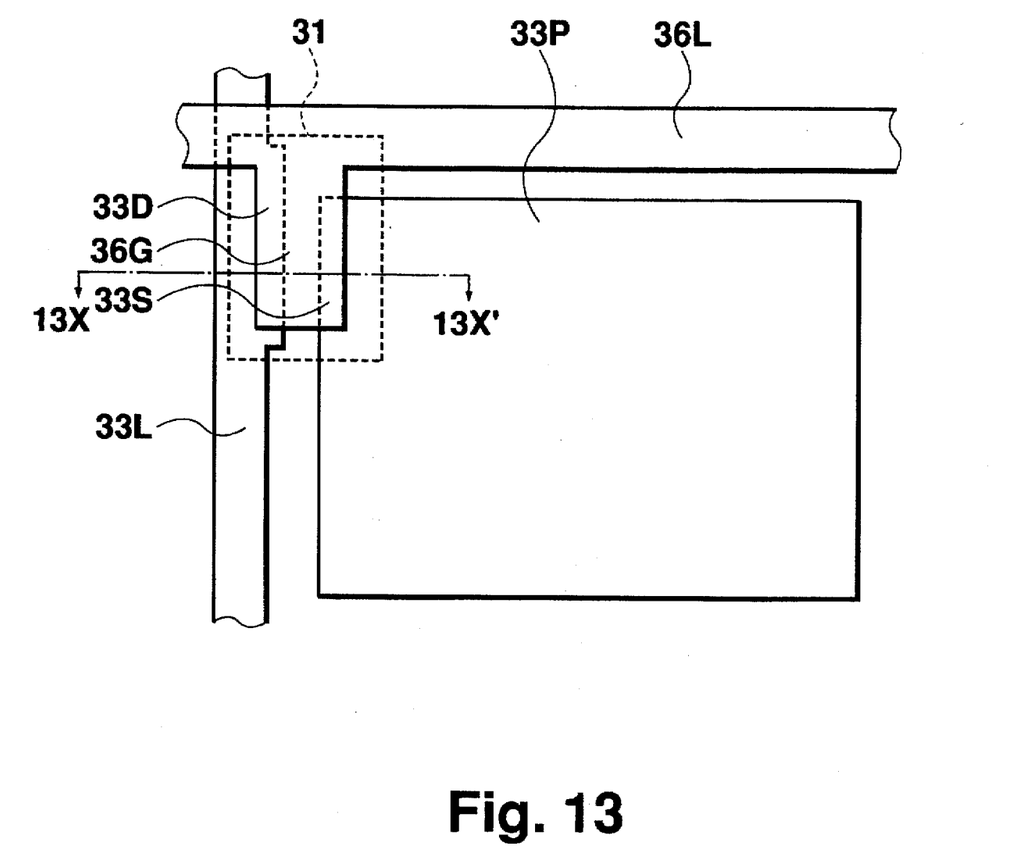
FIG. 13 is a plan view of the liquid-crystal display according to Embodiment 2 of the invention.
Figure 14:
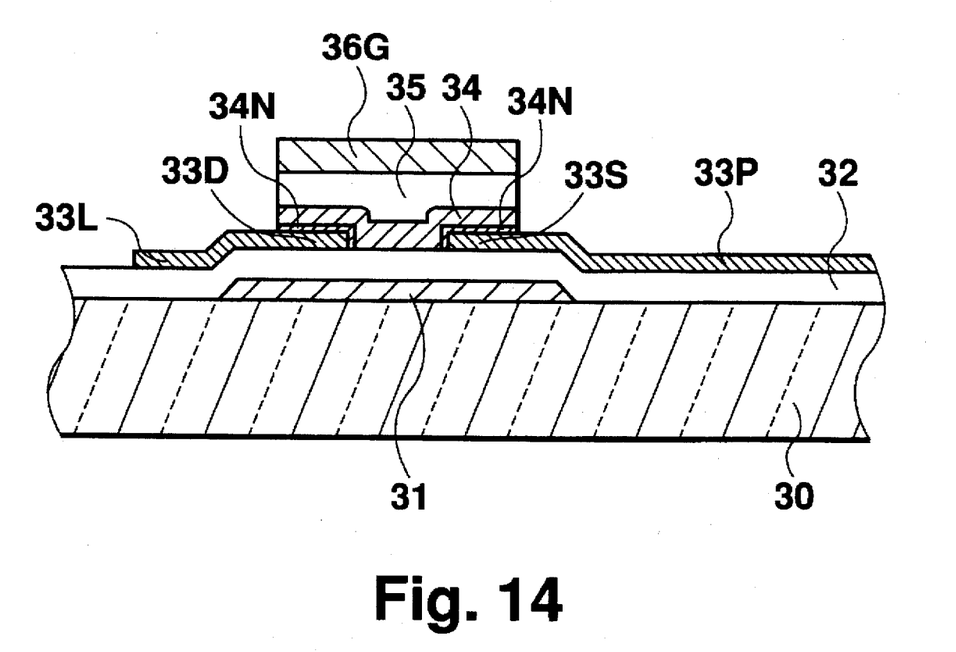
FIG. 14 is a partial cross-sectional view of the liquid-crystal display of FIG. 13 taken along line 13X-13X'.

This embodiment will be described with reference to FIG. 13 and FIG. 14.

On a transparent substrate (30) such as glass, Cr was sputtered and photoetched to form a shading layer (31) having a thickness of about 3000 angstroms, and an $SiO_2$ film with a thickness of 5000 angstroms was formed to entirely cover the shading layer (31) using CVD (chemical vapor deposition) to form an interlayer insulating layer (32). The shading layer (31) covers a region where a TFT is formed.

ITO was sputtered onto a film having a thickness of 1500 angstroms on the interlayer insulating layer (32). A pixel electrode (33P) for driving a liquid crystal, a drain line (33L) around the pixel electrode (33P), a source electrode (33S) integral with the pixel electrode (33P), and a drain electrode (33D) integral with the drain line (33L) were formed by photoetching.

An a-Si layer (34) forming a channel area and a gate insulating film (35) were formed on the source electrode (33S), the drain electrode (33D), and an area between the source electrode (33S) and the drain electrode (33D). A gate electrode (36G) continued from a gate line (36L) was formed on the gate insulating film (35). A TFT consists of the gate electrode (36G), the gate insulating film (35), the a-Si layer (34), the source electrode (33S), and the drain electrode (33D).

The gate electrode (36G) and the gate line (36L) are made of an Al—Nd alloy having 2% by weight of Nd contained in Al. Amorphous silicon (a-Si) and SiNx were successively formed into films having thicknesses of 3000 and 5000 angstroms, respectively using plasma CVD without breaking a vacuum. Then, the above Al—Nd was sputtered onto a film having a thickness of 3000 angstroms. These three layers were etched by using the same-patterned mask (one and the same mask).

An N+ a-Si layer (34N) was held between the a-Si layer (34) and the source electrode (33S) and between the a-Si layer (34) and the drain electrode (33D) to attain the ohmic characteristics of the TFT. The N+ a-Si layer (34N) is a layer formed as an N+ type film between the ITO and the a-Si layer in the same way as in Embodiment 1 where phosphorus, which was implanted into ITO when sputtering the ITO, was dispersed toward the a-Si layer to react with it when the a-Si layer (34) was formed into a film by the plasma CVD.

Thus, this embodiment forms the gate electrode and line (36) by using the Al—Nd alloy having 2% by weight of Nd contained in Al. The Al—Nd alloy has high heat resistance and hardly produces hillocks during a high-temperature process. In an LCD made by a 3 masking process (3 step LCD) whose cost was lowered by forming the a-Si (34) and the gate insulating film (35) to have the same pattern as the gate electrode and line (36), even at the intersection of the gate electrode and line (36), and the drain electrode and line (33) with the gate insulating layer (35) therebetween, no short-circuit occurred between the drain electrode and line (33) and the gate electrode and the line (36) due to the hillocks formed on the gate electrode and line (36).

Figure 15:
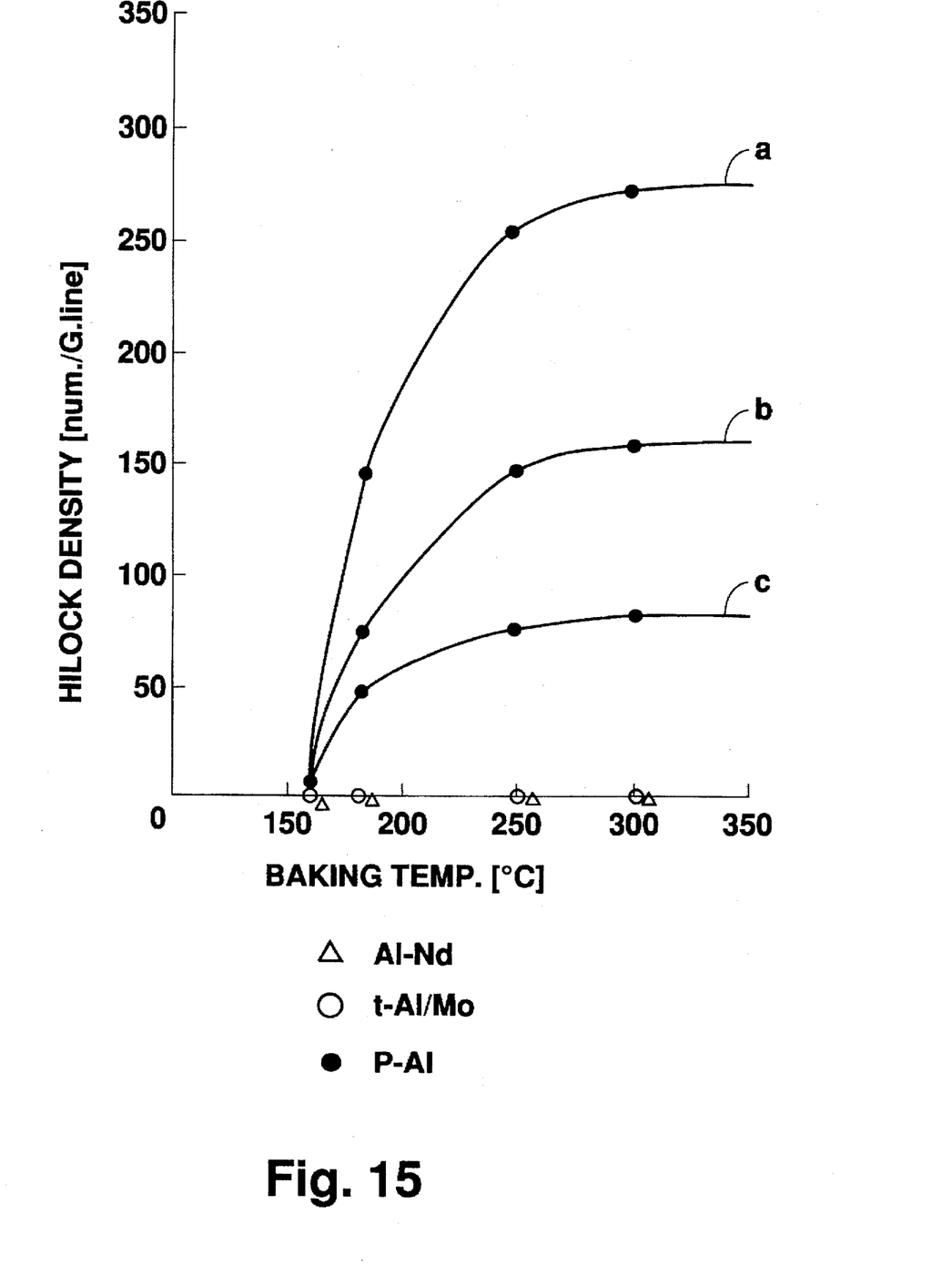
FIG. 15 is a graph showing the hillock density according to Embodiment 2 of the invention.

FIG. 15 shows the test results concerning the occurrence of hillocks when TFT array substrates were made by using various kinds of metal and baking them. When a test was conducted by using as a gate metal the Al—Nd (2% by weight) having a thickness of 3000 angstroms of this embodiment, the number of hillocks formed on one gate line was indicated by a triangle (Δ). When a comparative example was conducted by forming pure Al(p-Al) into a film and immediately annealing it to use as a gate electrode and line, the number of hillocks formed on one gate line was indicated by a black circle (●). Further, when a test was also conducted by making a thin Al(t-Al) film into Al/Mo having a thickness 500/3000 angstroms to use as a gate electrode and line, the number of hillocks formed on one gate line was indicated by a circle (○). Curves (a), (b) and (c) in the graph indicate the results obtained by making p-Al films, and determining their annealing temperatures to be 180°, 190° and 200° C., respectively. It is seen from the graph that the Al—Nd does not form hillocks at 300° C. or below, and a short-circuit can be almost completely prevented from occurring between the gate and the source and between the gate and the drain due to hillocks by using the Al—Nd as the gate electrode and line (36) in a process conducted at a temperature range below the above level. Formation of hillocks is also suppressed when the t-Al is used, but since it has a disadvantage with respect to a line resistance as described above, it is not suitable for a large-sized display. Meanwhile, when the p-Al was used, hillocks were formed, and the number of hillocks was variable depending on the annealing temperature after film forming. Namely, the formation of grains is promoted when annealed at a higher temperature, the film quality is improved, and the number of hillocks formed is decreased. However, the growth of hillocks is conversely promoted, and the possibility of reaching the source and drain electrode and line (33) is increased, with the result that reduction of short-circuits is not achieved. Particularly, the annealing temperature of the Al is required to be increased substantially in order to decrease the possibility of occurrence of short-circuits by fully decreasing the number of hillocks produced. However, in the configuration according to this invention, the a-Si has been formed when the gate Al film is formed, so that the increase of the annealing temperature immediately degrades the a-Si or changes the TFT characteristics, resulting in lack of practicability.

In the 3 step LCD whose production process is simplified by using the Al—Nd alloy having 2% by weight of Nd contained in Al as a material for making the gate electrode (36G) and line (36L) and forming the a-Si (34), the gate insulating layer (35) and the gate electrode (36G) and line (36L) into the same pattern, even at the intersection of the gate electrode and line (36) and the source (33S) and drain (33D) electrode and line (33L) with the gate insulating layer (35) therebetween, no short-circuit occurs between them (33S, 33D, 36G), thus improving the yield. Using the Al—Nd alloy of this embodiment as the gate electrode and line material of Embodiment 1, a short-circuit between the electrodes due to the formation of hillocks can be prevented completely.

It is obvious from the above description that the improvement of heat resistance by using Al containing Nd as the gate electrode and line material for the liquid-crystal display using the staggered type TFTs prevented the formation of hillocks. Thus, the structure of the gate (electrode and line) and the source/drain (electrode and line) which were insulated by the thickness of the insulating layer having the same shape as the gate (electrode and line) prevented a short-circuit from occurring between the above electrodes and lines due to hillocks, thus improving the yield.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A liquid-crystal display comprising:
    a plurality of pixel electrodes for driving a liquid crystal set in a matrix array on a substrate,
    a plurality of drain lines formed between columns of said pixel electrodes,
    a plurality of gate lines formed between rows of said pixel electrodes, said gate lines patterned into a first shape and having lower layers including an insulating layer and a semiconductor layer each patterned into a second shape substantially similar to said first shape of said gate lines under an entire region of said gate lines, and
    a plurality of thin film transistors, each formed adjacent to a crossing point of a corresponding one of said drain lines and a corresponding one of said gate lines, each applying a voltage to a corresponding one of said pixel electrodes; each of said thin film transistors having:
        a source electrode including a portion of said corresponding one of said pixel electrodes,
        a drain electrode including a portion of said corresponding one of said drain lines, said semiconductor layer formed to extend over said source electrode and said drain electrode, said insulating layer formed on said semiconductor layer, and
        a gate electrode formed on said insulating layer and including a portion of said corresponding one of said gate lines, wherein said corresponding one of said gate lines and said gate electrode are formed to be narrower than a line width of said insulating layer.

2. The liquid-crystal display of claim 1, wherein said gate electrode and said corresponding one of said gate lines include Al containing Nd.

3. The liquid-crystal display of claim 1, wherein a substantially tapered shading layer is formed at a position corresponding to a channel area of said thin film transistor on said substrate.

4. The liquid-crystal displaying of claim 1, wherein a width of said corresponding one of said gate lines and said electrode is narrower than said line width of the insulating layer and the semiconductor layer in accordance with a side-etching quantity.

5. A process for producing a liquid-crystal display including:
    a plurality of pixel electrodes for driving a liquid crystal set in a matrix array on a substrate,
    a plurality of drain lines formed between columns of said pixel electrodes,
    a plurality of gate lines formed between rows of said pixel electrodes and having lower layers including an insulating layer and a semiconductor layer, and
    a plurality of thin film transistors, each formed adjacent to a crossing point of a corresponding one of said drain lines and a corresponding one of said gate lines, each applying a voltage to a corresponding one of said pixel electrodes; each of said thin film transistors having:
        a source electrode including a portion of said corresponding one of said pixel electrodes,
        a drain electrode including a portion of said corresponding one of said drain lines, said semiconductor layer formed to extend over said source electrode and said drain electrode, said insulating layer formed on said semiconductor layer, and
        a gate electrode formed on said insulating layer and including a portion of said corresponding one of said gate lines;
    said production process comprising:
        forming a transparent conducting layer on said substrate,
        etching said transparent conducting layer with a first mask to form said pixel electrodes, said drain lines, said source electrodes and said drain electrodes,
        sequentially forming said semiconductor layer, said insulating layer and a gate conducting layer after forming said drain lines and said pixel electrodes, said source electrodes and said drain electrodes,
        forming a second mask on said gate conducting layer and etching said gate conducting layer with said second mask into a substantially similar shape as said second mask,
        further etching a side face of said etched gate conducting layer to provide said gate conducting layer with a pattern having a line width narrower than said second mask to form said gate lines and said gate electrodes, and
        subsequently etching said insulating layer and said semiconductor layer with said second mask so as to give said insulating layer and said semiconductor layer said substantially similar shape as said second mask.

6. The process for producing a liquid-crystal display of claim 5, wherein said gate conducting layer is etched by a wet type etching process, and said insulating layer and said semiconductor layer are etched by a dry type etching process.

7. The process for producing a liquid-crystal display of claim 5, wherein said gate conducting layer is etched by a plasma etching process, and said insulating layer and said semiconductor layer are etched by a dry type etching process.

8. The process for producing a liquid-crystal display of claim 5, wherein said gate conducting layer including said gate lines and said gate electrode includes Al containing Nd.

9. The process for producing a liquid-crystal display of claim 5, including:

forming a light-insulating layer of Cr at a position corresponding to a channel section of said thin film transistor on said substrate before forming said thin film transistor; and making an upper layer of said light-insulating layer with chromium nitride in a nitrogen atmosphere when producing said upper layer of said light-insulating layer, and etching said light-insulating layer to form a substantially tapered shading layer.

10. A liquid-crystal display comprising:

a plurality of pixel electrodes for driving a liquid crystal set in a matrix array on a substrate, a plurality of drain lines formed between columns of said pixel electrodes, a plurality of gate lines formed between rows of said pixel electrodes, said gate lines patterned into a first shape and having lower layers including an insulating layer and a semiconductor layer each patterned into a second shape substantially identical to said first shape of said gate lines under an entire region of said gate lines, and a plurality of thin film transistors, each formed adjacent to a crossing point of a corresponding one of said drain lines and a corresponding one of said gate lines, each applying a voltage to a corresponding one of said pixel electrodes; each of said thin film transistors having:

a source electrode including a portion of said corresponding one of said pixel electrodes, a drain electrode including a portion of said corresponding one of said drain lines, said semiconductor layer formed to extend over said source electrode and said drain electrode, said insulating layer formed on said semiconductor layer, and a gate electrode formed on said insulating layer and including a portion of said corresponding one of said gate lines, wherein said corresponding one of said gate lines and said gate electrode include Al containing Nd.

11. A liquid-crystal display comprising:

a plurality of pixel electrodes for driving a liquid crystal set in a matrix array on a substrate;

a plurality of drain lines formed between columns of said pixel electrodes;

a plurality of gate lines formed between rows of said pixel electrodes, said gate lines patterned into a first shape and having an insulating layer and a semiconductor layer each patterned into a second shape substantially similar to said first shape of said gate lines under an entire region of said gate lines; and a plurality of thin film transistors, each formed adjacent to a crossing point of a corresponding one of said drain lines and a corresponding one of said gate lines, each applying a voltage to a corresponding one of said pixel electrodes; each of said thin film transistors having:

a source electrode including a portion of said corresponding one of said pixel electrodes;

a drain electrode including a portion of said corresponding one of said drain lines, said semiconductor layer formed to extend over said source electrode and said drain electrode, said insulating layer formed on said semiconductor layer; and a gate electrode formed on said insulating layer and including a portion of said corresponding one of said gate lines, wherein said insulating layer and said semiconductor layer have first edge lines, said gate lines and said gate electrode have second edge lines located inside the first edge lines of said insulating layer and said semiconductor layer, and said corresponding one of said gate lines, said gate electrode, said insulating layer, and said semiconductor layer are patterned by etching with only one mask.

12. The liquid-crystal display according to claim 11, wherein a width of the gate lines and the gate electrodes is narrower than a width of the insulating layer and the semiconductor layer in accordance with a side-etching quantity.

* * * * *